(12) United States Patent
Zhou

(10) Patent No.: US 11,110,733 B2
(45) Date of Patent: Sep. 7, 2021

(54) FABRIC PRINT MEDIUM

(71) Applicant: Hewlett-Packard Development Company, L.P., Fort Collins, CO (US)

(72) Inventor: Xiaoqi Zhou, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 288 days.

(21) Appl. No.: 16/306,907

(22) PCT Filed: Sep. 9, 2016

(86) PCT No.: PCT/US2016/051045
§ 371 (c)(1),
(2) Date: Dec. 4, 2018

(87) PCT Pub. No.: WO2018/048422
PCT Pub. Date: Mar. 15, 2018

(65) Prior Publication Data
US 2020/0290391 A1  Sep. 17, 2020

(51) Int. Cl.
*B41M 5/50* (2006.01)
*B41M 5/52* (2006.01)

(52) U.S. Cl.
CPC .......... *B41M 5/5272* (2013.01); *B41M 5/506* (2013.01); *B41M 5/508* (2013.01);
(Continued)

(58) Field of Classification Search
CPC .... B41M 5/5272; B41M 5/506; B41M 5/508; B41M 5/5281
(Continued)

(56) References Cited

U.S. PATENT DOCUMENTS 6,001,137 A   12/1999  Alfekri et al.
6,017,611 A    1/2000  Cheng et al.
(Continued)

FOREIGN PATENT DOCUMENTS

CA   2528351   1/2005
CN   1240716   1/2000
(Continued)

OTHER PUBLICATIONS

International Search Report dated May 18, 2017 for PCT/US2016/051045 filed Sep. 9, 2016; Applicant Hewlett-Packard Development Company, L.P.

*Primary Examiner* — Betelhem Shewareged
(74) *Attorney, Agent, or Firm* — HP Inc. Patent Department

(57) ABSTRACT

A fabric print medium containing a fabric base substrate with a first and a second side; a polymeric barrier layer that is extruded, or a polymeric barrier layer with adhesion property that is laminated, on at least one side of the fabric base substrate; a primary coating composition that includes a polymeric binder and filler particles applied over a polymeric barrier layer; and an image-receiving coating composition that includes, at least, a first crosslinked polymeric network and a second crosslinked polymeric network, that is applied over the primary coating composition. Also disclosed are the method for making such fabric print medium and the method for producing printed images using said material.

16 Claims, 3 Drawing Sheets

(52) U.S. Cl.
CPC ........... *B41M 5/5281* (2013.01); *B41M 5/502* (2013.01); *B41M 5/52* (2013.01)

(58) Field of Classification Search
USPC ...................................................... 428/32.16
See application file for complete search history.

(56) References Cited

U.S. PATENT DOCUMENTS

| | | | |
|---|---|---|---|
| 6,478,980 | B2 | 11/2002 | Nigam |
| 6,589,633 | B1 | 7/2003 | Ino et al. |
| 6,884,491 | B2 | 4/2005 | Rubin et al. |
| 8,361,573 | B2 | 1/2013 | Koenig |
| 8,512,826 | B2 | 8/2013 | Sturme et al. |
| 2003/0157303 | A1 | 8/2003 | Li et al. |
| 2004/0202832 | A1 | 10/2004 | Nigam et al. |
| 2004/0248492 | A1 | 12/2004 | Baker |
| 2005/0145325 | A1 | 7/2005 | Kronzer et al. |
| 2005/0233662 | A1 | 10/2005 | Kimbrell et al. |
| 2005/0245156 | A1 | 11/2005 | Cates et al. |
| 2006/0281849 | A1 | 12/2006 | Johnson |
| 2007/0172610 | A1 | 7/2007 | Williams |
| 2008/0057232 | A1 | 3/2008 | Leon et al. |
| 2009/0178186 | A1 | 7/2009 | Truesdale |
| 2009/0208675 | A1 | 8/2009 | Nigam |
| 2011/0008542 | A1* | 1/2011 | Zeng ............... B41M 5/502 427/288 |
| 2011/0102497 | A1 | 5/2011 | Sato et al. |
| 2014/0068877 | A1 | 3/2014 | Ellis |
| 2015/0152592 | A1* | 6/2015 | Fu ............... D06B 21/00 428/196 |
| 2016/0059606 | A1 | 3/2016 | Zhou et al. |
| 2016/0243870 | A1 | 8/2016 | Fu et al. |

FOREIGN PATENT DOCUMENTS

| | | |
|---|---|---|
| CN | 101104351 | 1/2008 |
| CN | 101679821 | 3/2010 |
| CN | 101687425 | 3/2010 |
| CN | 101802891 | 8/2010 |
| CN | 101945937 | 1/2011 |
| CN | 101983132 | 3/2011 |
| CN | 102197085 | 9/2011 |
| CN | 102470667 | 5/2012 |
| CN | 103012941 | 4/2013 |
| CN | 103442898 | 12/2013 |
| CN | 103450544 | 12/2013 |
| CN | 103554595 | 2/2014 |
| CN | 104053553 | 9/2014 |
| CN | 104272501 | 1/2015 |
| CN | 104364086 | 2/2015 |
| CN | 104411749 | 3/2015 |
| CN | 104507700 | 4/2015 |
| CN | 104662228 | 5/2015 |
| CN | 105163947 | 12/2015 |
| CN | 105377569 | 3/2016 |
| CN | 105377570 | 3/2016 |
| CN | 105531121 | 4/2016 |
| CN | 105705339 | 6/2016 |
| CN | 105899651 | 8/2016 |
| EP | 1048479 | 11/2000 |
| EP | 1216839 | 6/2002 |
| JP | H09226229 | 9/1997 |
| JP | 2000203150 | 7/2000 |
| RU | 2110410 | 5/1998 |
| WO | 2010114899 | 10/2010 |
| WO | 2013162578 | 10/2013 |
| WO | 2014014453 | 1/2014 |
| WO | 2014035414 | 3/2014 |
| WO | 2015041666 | 3/2015 |
| WO | 2015108564 | 7/2015 |
| WO | 2015126374 | 8/2015 |
| WO | 2015142313 | 9/2015 |

\* cited by examiner

FABRIC PRINT MEDIUM

BACKGROUND

Inkjet printing technology has expanded its application to large format high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric, and the like. The substrate plays a key role in the overall image quality and permanence of printed images.

Textile printing has various applications including the creation of signs, banners, artwork, apparel, wall coverings, window coverings, upholstery, pillows, blankets, flags, tote bags, etc. It is a growing and evolving area and is becoming a trend in the visual communication market. As the area of textile printing continues to grow and evolve, the demand for new print mediums increases.

BRIEF DESCRIPTION OF THE DRAWING

The drawings illustrate various examples of the present print medium and are part of the specification.

DETAILED DESCRIPTION

Figure 1:
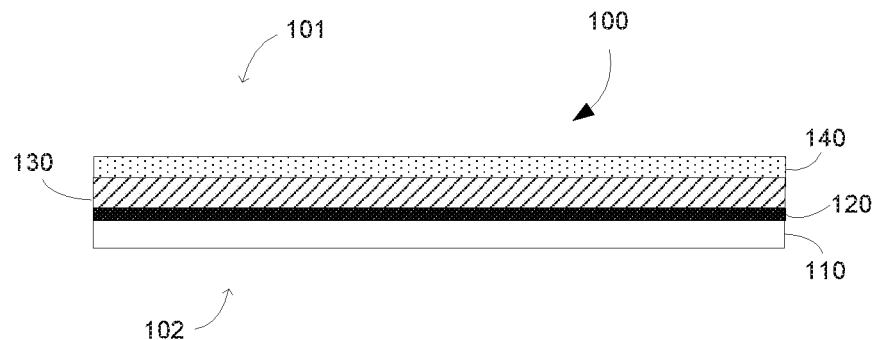
FIGS. 1 and 2 are cross-sectional views of the fabric print medium according to examples of the present disclosure.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

When printing on fabric substrates, challenges exist due to the specific nature of fabric. Indeed, often, fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images are often poor compared to images printed on cellulose paper or other media types. Durability, such as rubbing resistance, is another concern when printing on fabric, particularly when pigmented inks and ink compositions containing latex are used. Furthermore, when fabric is intended to be used in close proximity to indoor environments (as drapes, as overhead signage, as part of furnishings, or the like), there are concerns about flame resistance as well as about using coatings that increase the flammability of the fabric. Thus, fire/flame resistance or inhibition characteristics are also desirable when providing printable fabrics. Further, the softness of the fabric printing media, also called "hands feeling", is an important and desirable feature. Treatments to the fabric base, such as coating, often causes media stiffer that can result in easily wrinkling and white line when material is folded or bended. The present disclosure is directed to a fabric print medium that meet, to some extent, the features described above.

In one example, the present disclosure is drawn to a fabric print medium with a fabric base substrate having a first and a second side; a polymeric barrier layer that is extruded, or a polymeric barrier layer with adhesion property that is laminated, on at least one side of the fabric base substrate; a primary coating composition, including a polymeric binder and filler particles, over the barrier layer; and an image-receiving coating composition including a first and a second crosslinked polymeric network applied over the primary coating composition. The present disclosure also relates to a method for forming said fabric print medium and to the printing method using said fabric print medium.

In another example, the present disclosure is directed to an image recording medium comprising a fabric base substrate with a first and a second side; a polymeric barrier layer that is extruded, or a polymeric barrier layer with adhesion property that is laminated, on at least one side of the fabric base substrate wherein the polymeric barrier layer contains resins that are selected from the group consisting of high density polyethylene (HDPE), low density polyethylene (LDPE), polypropylene (PP), polymethylpentene (PMP), and copolymers of ethylene with hexane, butane, and octane (linear low density polyethylene, LLDPE); a primary coating composition applied over the polymeric barrier layer; and an image-receiving coating composition over the primary coating composition.

The image printed on the fabric print medium of the present disclosure exhibits excellent printing qualities and durability. By using such coating composition, in combination with the fabric print medium, the printing process is more accurate and the printed image is more permanent. In addition, the printed media has very good softness. The resultant printed fabric will also be able to provide fire/flame resistance or inhibition to the fabric. The present disclosure refers to a fabric print medium comprising a fabric base substrate and coating compositions applied to said fabric base substrate. The coating compositions, also called treatment compositions, once applied on the fabric base substrate, form thin layers onto the fabric base surface.

Figure 2:
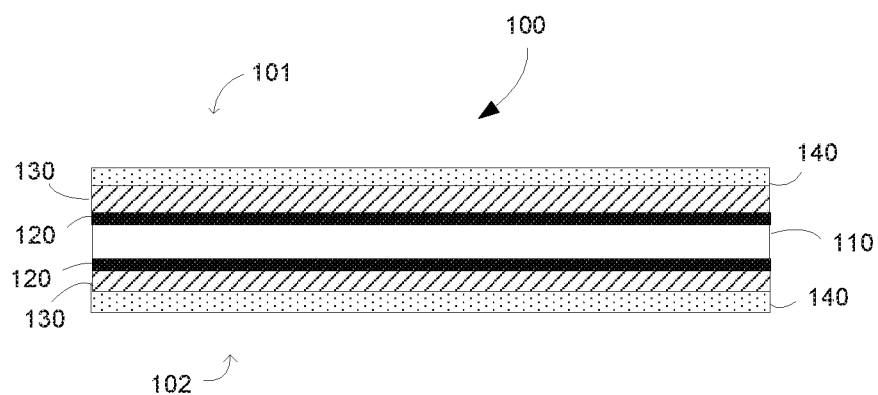

FIG. 1 and FIG. 2 illustrate the fabric print medium (100) as described herein. The fabric print medium (100) has two sides (101) and (102) and comprise a fabric base substrate (110), a polymeric barrier layer (120), a first coating composition or primary coating layer (130), and a second coating composition or image-receiving layer (140). As illustrated in FIG. 1, the fabric print medium (100) encompasses a fabric base substrate (110) that includes a polymeric barrier layer (120) applied on at least one side (101) over which is applied a first coating composition or primary coating layer (130) and a second coating composition or image-receiving layer (140). In FIG. 1, the polymeric barrier layer (120), the first coating composition (130) and the second coating composition (or image-receiving layer) (140) are applied on one side only of the fabric base substrate (110). In some other examples, such as illustrated in FIG. 2, the polymeric barrier layer (120), the first coating composition (130) and the image-receiving layer (140) are applied to both opposing sides of the supporting fabric base substrate (110). The double-side coated media has thus a sandwich structure, i.e. both sides of the fabric base substrate (110) are coated with the coatings and both sides may be printed.

Figure 3:
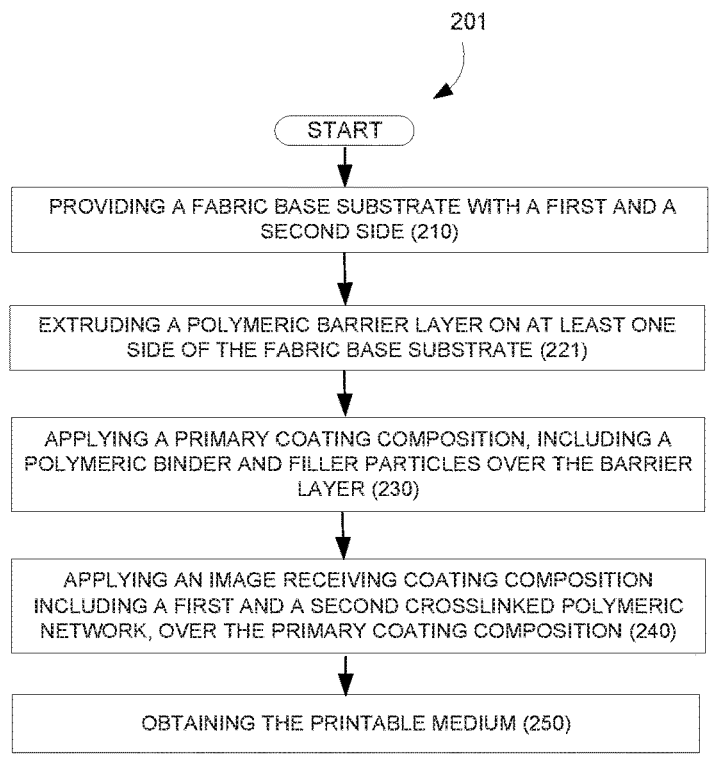
FIGS. 3 and 4 are flowcharts illustrating methods for producing the fabric print medium according to some examples of the present disclosure.
Figure 4:
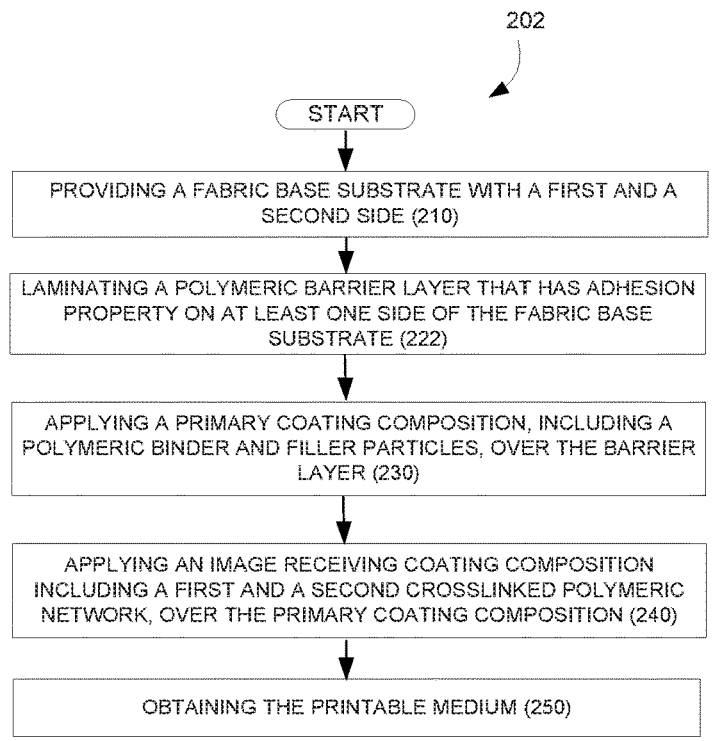

An example of a method for forming a fabric print medium in accordance with the principles described herein, by way of illustration and not limitation, is shown in FIG. 3. Such method (201) encompasses providing a fabric base substrate with a first and a second side (210); extruding a polymeric barrier layer on at least one side of the fabric base substrate (221); applying a primary coating composition including a polymeric binder and filler particles over the barrier layer (230); and applying an image-receiving coating composition including a first and a second crosslinked polymeric network, over the primary coating composition (240). Another example of a method for forming a fabric print medium in accordance with the principles described herein, by way of illustration and not limitation, is shown in FIG. 4. This method (202) encompasses providing a fabric base substrate with a first and a second side (210); laminating a polymeric barrier layer with adhesion property on, at least, one side of the fabric base substrate (222); applying a primary coating composition including a polymeric binder and filler particles over the barrier layer (230); and applying an image-receiving coating composition including a first and a second crosslinked polymeric network, over the primary coating composition (240). When laminated, the polymeric barrier layer has adhesion property. In some examples, the polymeric barrier layer will be laminated with an adhesive compound if the polymeric barrier layer does not have itself adhesion properties.

Figure 5:
FIG. 5 is a flowchart illustrating a method for producing printed images according to some examples of the present disclosure.

An example of a printing method in accordance with the principles described herein, by way of illustration and not limitation, is shown in FIG. 5. FIG. 5 illustrates examples of the printing method (300) that encompasses providing a fabric print medium (310), comprising a fabric base substrate with a first and a second side; a polymeric barrier layer that is extruded, or a polymeric barrier layer with good adhesion property that is laminated, on at least one side of the fabric base substrate; a primary coating composition including a polymeric binder and filler particles applied over the polymeric barrier layer; and an image-receiving coating composition including a first and a second crosslinked polymeric network that is applied over the primary coating composition; applying an ink composition onto said a print medium (320) and obtaining a printed article (330).

The polymeric barrier layer (120) can be applied to the first side (101), to the second side (102), or to both sides (101) and (102) of the fabric base substrate (110). When applied to the first side and to the second side, the polymeric barrier layer can be the same or can be different on each sides. The polymeric barrier layer (120) can be applied to the fabric substrate (110) at a variety of coat weights. In one example, the polymeric barrier layer (120) is applied to the fabric base substrate at a dry coat weight ranging from about 0.5 gram per square meter ($g/m^2$ or gsm), per side, to about 50 gram per square meter ($g/m^2$ or gsm) per side, or at a dry coat weight ranging from about 2 gram per square meter ($g/m^2$ or gsm) to about 5 gram per square meter ($g/m^2$ or gsm) per side.

In some examples, the primary coating layer is applied over the polymeric barrier layer (120) at a variety of coat weights. In one example, the primary coating layer can be applied at a dry coat weight ranging from about 5 gram per square meter ($g/m^2$ or gsm) per side to about 200 gram per square meter ($g/m^2$ or gsm) per side. In one other example, the primary coating layer can be applied, over the polymeric barrier layer, at a dry coat weight ranging from about 10 gram per square meter ($g/m^2$ or gsm) per side to about 150 gram per square meter ($g/m^2$ or gsm) per side. In yet another example, the primary coating layer (110) can be applied, over the polymeric barrier layer, at a coating weight ranging from about 15 gsm to about 50 gsm.

The second coating composition or image-receiving layer (140) can be applied, over to the primary coating layer (130), on the first side (101), on the second side (102), or on both sides (101) and (102) of the fabric base substrate (110). When applied to the first side and to the second side, the composition of the image-receiving layer (140) can be the same or can be different on each sides. The image-receiving layer composition (140) can be applied, over the primary coating layer (130), at a dry coat weight ranging from about 0.5 gram per square meter ($g/m^2$ or gsm) per side to about 50 gram per square meter ($g/m^2$ or gsm) per side. The image-receiving layer composition can be applied to the primary coating layer at a thickness ranging from about 1 µm to about 50 µm.

In some examples, the first coating composition or primary coating layer or primary coating composition (130) can be applied over the polymeric barrier layer (110), at a dry coat weight ranging from 10 gsm to 50 gsm and the second coating composition or image-receiving layer (140) can be applied, over the primary coating layer at a dry coat weight ranging from about 3 gsm to about 15 gsm. In some other examples, the first coating composition (130) can be applied over the polymeric barrier layer (110), at a dry coat weight ranging from 10 gsm to 150 gsm and the image-receiving layer (140) can be applied, over the primary coating layer, at a dry coat weight ranging from about 5 gsm to about 75 gsm. The primary coating layer can be at least two times thicker than the secondary coating layer. In another example, the primary coating layer can be at least three times thicker than the secondary coating layer.

In some examples, the first coating composition or primary coating layer (130) can be applied to the first side and to the second side of the fabric substrate (110), over the polymeric barrier layer, at a thickness ranging from about 2 µm to about 200 µm, with a dry coat weight ranging from about 5 gram per square meter ($g/m^2$ or gsm) to about 200 gram per square meter ($g/m^2$ or gsm) per side. In some other examples, the second coating composition or image-receiving layer (140) can be applied to the primary coating layer on both the first side and the second side of the fabric substrate (110), at a thickness from about 1 μm to about 50 μm with a dry coat weight ranging from about 0.5 gram per square meter (g/m² or gsm) to about 80 gram per square meter (g/m² or gsm) per side. The primary coating layer (130) can be, at least, two times thicker than the secondary coating layer (140).

The Fabric Base Substrate (110)

A fabric print medium (100) of the present disclosure, that can also be called herein printable recording media, is a fabric media that comprises a fabric base substrate (110). The fabric base substrate (110) can also be called bottom supporting substrate or fabric supporting substrate. The word "supporting" also refers to a physical objective of the substrate that is to carry the coatings layer and the image that is going to be printed.

Regarding such fabric base substrate, any textile, fabric material, fabric clothing, or other fabric product where there is a desire for application of printed matter can benefit from the principles described herein. More specifically, fabric substrates useful in present disclosure include substrates that have fibers that may be natural and/or synthetic. The term "fabric" as used to mean a textile, a cloth, a fabric material, fabric clothing, or another fabric product. The term "fabric structure" is intended to mean a structure having warp and weft that is one of woven, non-woven, knitted, tufted, crocheted, knotted, and pressured, for example. The terms "warp" and "weft" refers to weaving terms that have their ordinary means in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or mixture of both types of fibers). The paper thereon is defined as the felted sheet, roll and other physical forms, which are made of various plant fibers (like trees or mixture of plant fibers) with synthetic fibers by laid down on a fine screen from a water suspension. Furthermore, fabric substrates include both textiles in its filament form, in the form of fabric material, or even in the form of fabric that has been crafted into finished article (clothing, blankets, tablecloths, napkins, bedding material, curtains, carpet, shoes, etc.). In some examples, the fabric base substrate has a woven, knitted, non-woven or tufted fabric structure.

In some examples, the fabric base substrate comprises wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof. In some other examples, the fabric base substrate is woven, knitted, non-woven or tufted and comprises natural or synthetic fibers selected from the group consisting of wool, cotton, silk, rayon, thermoplastic aliphatic polymers, polyesters, polyamides, polyimides, polypropylene, polyethylene, polystyrene, polytetrafluoroethylene, fiberglass, polycarbonates polytrimethylene terephthalate, polyethylene terephthalate and polybutylene terephthalate. In yet some other examples, the fabric base substrate is a synthetic polyester fiber.

In some examples, the fabric base substrate (110) has a basis weight that is ranging from about 50 gsm to about 400 gsm. In some other examples, the basis weight of the fabric substrate can range from about 100 gsm to about 300 gsm.

The fabric base substrate can be a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. The fabric base substrate can be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure that is formed from a separate yarn mainly introduced in a longitudinal fabric direction. The fabric base substrate can also be a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric base substrate can include one or both of natural fibers and synthetic fibers. Natural fibers that may be used include, but are not limited to, wool, cotton, silk, linen, jute, flax or hemp. Additional fibers that may be used include, but are not limited to, rayon fibers, or those of thermoplastic aliphatic polymeric fibers derived from renewable resources, including, but not limited to, corn starch, tapioca products, or sugarcanes. These additional fibers can be referred to as "natural" fibers. In some examples, the fibers used in the fabric base substrate includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric base substrate can be a polymeric fiber including, but not limited to, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company), fiberglass, polytrimethylene, polycarbonate, polyethylene terephthalate or polybutylene terephthalate. In some examples, the fibers include a combination of two or more of the above-listed polymeric fibers, a combination of any of the above-listed polymeric fibers with another polymeric fiber or with natural fiber, a mixture of two or more of the above-listed polymeric fibers, or a mixture of any of the above-listed polymeric fibers with another polymer fiber or with natural fiber. In some examples, the synthetic fiber includes modified fibers from above-listed polymers. The term "modified fibers" refers to one or both of the polymeric fiber and the fabric as a whole having underwent a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units in the substrate.

In some examples, the fabric base substrate contains both natural fiber and synthetic polymeric fiber. The amount of synthetic polymeric fibers can represent from about 20% to about 90% of the total amount of fiber. The amount of natural fibers can represent from about 10% to about 80% of amount of fiber.

The fabric base substrate may further contains additives including, but not limited to, one or more of colorant (e.g., pigments, dyes, tints), antistatic agents, brightening agents, nucleating agents, antioxidants, UV stabilizers, fillers and lubricants, for example. Alternatively, the fabric base substrate may be pre-treated in a solution containing the substances listed above before applying the coating composition. The additives and pre-treatments are included in order to improve various properties of the fabric.

Polymeric Barrier Layer (120)

The fabric print medium comprises a fabric base substrate with a first and a second side and a polymeric barrier layer that is extruded or that is laminated, on at least one side of the fabric base substrate. The polymeric barrier layer (120) can be applied on one side or on both sides of the fabric base substrate (110). The polymer barrier layer (120) is applied to the fabric base substrate by an extrusion or by a lamination process. When applied trough a lamination process, the lamination will be done with an adhesive compound if the polymeric barrier layer does not have any adhesion property. Alternatively, the lamination is done without an adhesive compound if the adhesion property provided by the polymer barrier layer is sufficient. By having "adhesion property", it is meant herein the ability to adhere or stich to the surface on with the layer is applied, here, for examples, the fabric base substrate. In some examples, the adhesion property of the polymeric barrier layer is due to the nature of the compound present in the polymeric barrier layer. In some other examples, the adhesion property of the polymeric barrier layer is due to the addition of an adhesive compound.

The polymeric barrier layer is a continuous polymeric barrier layer. The wording "continuous" refer herein to the fact that the polymer composition will form a layer without substantial whole or interruption; such layer would be consider as homogenous along the entire area of the fabric substrate. Without being linked by any theory, it is believed that one of the function of the polymeric barrier layers is to prevent any liquid substance to penetrate into the fabric base substrate and to create a smoother substrate surface for receiving coating layers. Liquid substances include coating compositions, while making the printing media, but also include any ink components such as solvent, co-solvent, dye and pigment. Other technical approaches such as any fabric treatment like the application of low surface energy chemicals to the fiber surface, or the coating any compositions which include polymeric resins and inorganic and organic fillers, polymer latex, polymer emulsions, and polymeric solution in any kind of solvents, polymerizable oligomers which can form polymers "in situ" under polymerization ready by heat, radiation initialization and alike, are excluded out of the definition as thin film or "continuous polymeric layer", since any non-continuous "domain-like" or microporous polymeric resin with filler composition, even if the polymer percentage is high, will reduce blocking ability to aqueous solvent and not improve the surface smoothness as described herein. Any coating layer made from aqueous dissolvable polymers, aqueous dispersible polymers like polymer latex and polymeric emulsion is also excluded from the definition of "continuous polymeric film" for the same reason.

The polymeric barrier layer (120) can be applied to the first side (101), to the second side (102), or to both sides (101) and (102) of the fabric base substrate (110). When applied to the first side and to the second side, the polymeric barrier layer can be the same or can be different on each sides. In one example, the polymeric barrier layer (120) is applied to the fabric base substrate at a dry coat weight ranging from about 0.5 gram per square meter ($g/m^2$ or gsm), per side, to about 50 gram per square meter ($g/m^2$ or gsm) per side, in top of the fabric base substrate. In one other example, the polymeric barrier layer (120) is applied to the fabric base substrate at a dry coat weight ranging from about 2 gram per square meter ($g/m^2$ or gsm) to about 20 gram per square meter ($g/m^2$ or gsm) per side, in top of the fabric base substrate. In some examples, the polymeric barrier layer (120) is applied, at a thickness ranging from about 0.5 µm to about 30 µm with a dry coat weight per side in top of the fabric base substrate. The polymeric barrier layer (120) is a continuous polymeric barrier layers or a "thin" film.

In some examples, the continuous polymeric barrier layer is extruded on at least one side of the fabric base substrate. In some other examples, the continuous polymeric barrier layer is extruded on both sides of the fabric base substrate. The polymers can be heat melt and then extruded on the fabric substrate through a slot die in some examples. In some other example, the polymeric barrier layer is laminated with an adhesive compound on at least one side of the fabric base substrate or is laminated with an adhesive compound on both sides of the fabric base substrate. In yet some example, the polymeric barrier layer is laminated without an adhesive compound on at least one side of the fabric base substrate or on both sides of the fabric base substrate.

When the polymeric barrier layer is laminated, the polymeric barrier could be thus considered as a laminated structure. The "laminated", as used herein, reflect the fact that the layers or compounds have been applied to the fabric base substrate using a lamination process. The polymer can be pre-filmed and can then be laminated onto the fabric base substrate by means of an added adhesive. In some examples, the adhesive compounds form an adhesive film that will be sandwiched between the fabric base substrate and the polymeric films forming the polymeric barrier. The polymeric barrier and the adhesive compound could then be laminated together in order to provide adhesion between the polymeric barrier layer and the fabric base substrate.

In some examples, the barrier layer is made through extrusion coating. The extrusion coating refers a coating processing in which the thermoplastic resin is melted and formed into thin hot film through a horizontal slot-die onto a moving web of substrate. The coated substrate then passes between a set of counter-rotating rolls, which press the coating onto the substrate to ensure complete contact and adhesion. The resulting product is a permanently coated web structure, i.e. the barrier layer. In another example, the barrier layer is made of extrusion lamination, where the resin is extruded between two fabric substrates and acts as a bonding agent besides as the barrier layer.

The polymeric materials used to make the barrier layer can be any thermal plastic material. In some examples, the polymeric barrier layer contains a polyolefin polymer material, an agro-based polymer material or combinations thereof. In some other examples, the polymeric barrier layer contains a polyolefin polymer material.

Examples of such polymer are, but not limited to polyolefins like polyethylene and its copolymers, polypropylene and its copolymers, acetal polymer, polyurethane, poly vinyl acetate, acrylic polymers, polyamides, polystyrene, polyvinyl chloride and its copolymers, polyvinylidene chloride, acrylonitrile polymers, butadiene styrene copolymers, polycarbonate, polyvinyl alcohol and its copolymers. The term polyolefin material refers to a polymer produced by olefin homo-polymerization or copolymerization reaction via either high-pressure polymerization or low pressure in the presence of special catalyst like Ziegler and metallocene catalysts, where olefin refers to a hydrocarbon compounds containing a carbon-carbon double bond alkene with general formula CnH2n. In some examples, the polymeric barrier layer contains polyolefin resins that include, but are not limited to, high density polyethylene (HDPE), low density polyethylene (LDPE), polypropylene (PP), polymethylpentene (PMP), and copolymers of ethylene with hexane, butane, and octane (linear low density polyethylene, LLDPE). In some other examples, the polymeric barrier layer contains resins that are selected from the group consisting of high density polyethylene (HDPE), low density polyethylene (LDPE), polypropylene (PP), polymethylpentene (PMP), and copolymers of ethylene with hexane, butane, and octane (linear low density polyethylene, LLDPE). In yet some other examples, the barrier layer is made of polyethylene terephthalate (PET). Further, in other examples, the barrier layer is made of agro-based materials where the term agro-based material refers to a polymer produced from biomass such as starches, a polymer produced by conventional or chemical synthesis such as polylactic acid (PLA), or a polymer produced by microbial such as poly-hydroxyl-alkanoates (PHAs). In some examples, the barrier layers comprises agro-based material such as starches, a polymer produced by conventional or chemical synthesis such as polylactic acid (PLA), or a polymer produced by microbial such as poly-hydroxyl-alkanoates (PHAs).

In some examples, the barrier layer contains resins copolymer. In some examples, a copolymer of polyolefin is used as the extruded material for barrier layer. These copolymer resins are commercial available, for example, but not limited to, Evatane® (ethylene vinyl acetate copolymers with 18-42% VA), Lotryl® (ethylene acrylate copolymers), Evasin® or poly-EVOH (ethylene vinyl alcohol copolymer), Lotader® (reactive polyolefin with up to 8% reactive group) Orevac® T (reactive EVA copolymers) Orevac® G, (grafted polyolefin like PE,PP, EVA, all from Arkema Co., Versify (ethylene and propylene copolymer) from Dow, and Elvax® Resins (ethylene and vinyl acetate copolymer).

In some examples, blends of polymer resins, which have different characteristic, are used in the polymeric barrier layer. In some other examples, the polymeric barrier layer contains blends of HDPE/LDPE, LDPE/LLDPE, PP/LDPE, or PP/LLDPE. The barrier layer can encompass, for example, low density polyethylene (LDPE) and high density polyethylene (HDPE) in a ratio that is between 30:70 and 70:30. In yet some other examples, the polymeric barrier layer contains blends of polymers that are selected from the group consisting of polyethylene (PE) and polypropylene (PP), blended with group consisting of polymethylpentene, polybutylene polymer, ethylene vinyl acetate polymer and mixtures thereof. Some blend compounds are commercially available such as Amplify®101, Amplify®102 and Amplify®103 provided by Dow Chemical Co.

In some examples, the polymeric barrier layer contains polymers or polymer blends (homo-polymer resin or copolymer resins), that have a glass transition temperature (Tg), that is below 10° C. In some other examples, the polymeric barrier layer contains polymers or polymer blends that have a glass transition temperature (Tg) that is below 0° C. In yet some other examples, the polymeric barrier layer contains polymers or polymer blends that have a glass transition temperature (Tg) that is about of −8° C.

In some e examples, the barrier layer can be made by a process, which is a continuous, at large scale, filmed structure deposited on top of the fabric substrate, or sandwich between two fabrics in the case of extrusion lamination. Due to surface tension of fabric surface, wetting ability of polymer melt, and dynamic procedure of the extrusion, there is voids, also called open domains with random varying size, present on the extruded filmed matrix, with total area less than 40% of total barrier layer in one example, and less than 25% in another example, and yet less than 15% in another example. As long as not alter significantly the barrier properties, we still consider the barrier layer as a "continuous layer", or layer based on a continuous extruded resin matrix. The barrier layer can be also built up through lamination process. In one example, the "lamination" refers to bring a pre-formed polymeric resin film onto the fabric substrate. In yet another example, the lamination in the current invention refers to two surface of film are contacted with two fabric substrate, either the same material, or different material, forming a sandwich structure. The lamination processing is differed from the "extrusion lamination" process where the polymeric resin is sandwiched.

In some examples, the polymeric resin film is laminated to form a barrier layer without using adhesive when the polymer used provide sufficient adhesion property to the barrier layer. In some other examples, the polymeric resin film is laminated to form a barrier layer with an adhesive compound when the barrier layer does not adhere on its own to the fabric based substrate. Polymeric barrier layer could thus comprises an adhesive compound. The barrier layer could utilized partially melt of the lamination film under heat and pressure, to provide adhesion force after cool. In some examples, the lamination could be accomplished by using the adhesive compound comprises ethylene, ethyl acrylate or acrylic ester and maleic anhydride repeat units. The adhesive compound can comprise ethylene, acrylic ester and maleic anhydride repeat unites or can comprises ethylene, ethyl acrylate and maleic anhydride repeat unite on molecular chains.

The adhesive compound can also be a terpolymer of ethylene, ethyl acrylate and maleic anhydride or can be a terpolymer of ethylene, acrylic ester and maleic anhydride. In yet some examples, the adhesive compound is a terpolymer of ethylene, acrylic ester and maleic anhydride. One example, by way of illustration and not limitation, of a commercially available polymer that is suitable as adhesive compound is Lotader® 3410 (available from Arkema).

In some examples, the barrier layer is made through a lamination process. The lamination processing refers a processing where the fabric substrate, the polymeric barrier layer with adhesion property from two separate material rolls are brought together through a combination nip under the pressure and heat. In some other examples, the lamination processing is accomplished via a procedure where the fabric substrate, the polymeric barrier layer and an adhesive film from separate multiple material rolls are brought together through a combination nip under the pressure and heat. In yet some other examples, the lamination processing refers a procedure where the fabric substrate, the polymeric barrier layer from two separate material rolls, with an adhesive material which is pre-applied on either film surface or fabric substrate surface are brought together through a combination nip under the pressure and heat.

The Primary Coating Composition (130)

The fabric print medium of the present disclosure comprises a fabric base substrate (110) with a first and a second side; a primary coating composition (130) applied to, at least, one side of the fabric base substrate and an image-receiving coating composition (140) that includes a first crosslinked polymeric network and a second crosslinked polymeric network. The primer layer or primary coating composition (130), is applied to, at least one side of the fabric base substrate (110), and is based on a treatment composition that includes at least a polymeric binder and filler particles.

In some examples, the primary coating layer can also include a flame retardant agent or filler particles with flame retardancy properties. Other functional additives can be added to the primary coating composition, for specific property control such as, for examples, optical brightener agent, optical brightener agent carrier, dyes for color hue, surfactant for wettability, and processing control agent such as deformer, and PH control base/acid buffer.

The primary coating composition (130) contains a polymeric binder. Without being linked by any theory, it is believed that the polymeric binder can provide binding function to the fillers to form a continuous layer and adhesion function between coating layers and the fabric substrate. The polymeric binder can be present, in the primary coating composition, in an amount ranging from about 10 wt % to about 95 wt % by total weigh of the primary coating layer. In one example, the polymeric binder can range from about 45 wt % to about 94 wt % of the primary coating layer. In another example, the polymeric binder can range from about 10 wt % to about 80 wt % of the primary coating layer. In yet another example, the polymeric binder can range from about 20 wt % to about 88 wt % of the primary coating layer.

The polymeric binder can be either water a soluble, a synthetic or a natural substances or an aqueous dispersible substance like polymeric latex. In some other examples, the polymeric binder is polymeric latex. The polymeric binder can be a water soluble polymer or water dispersible polymeric latex. In some examples, the polymeric binder has a glass transition temperature (Tg) that is less than 5° C. Indeed, it is believed that polymeric binder with higher glass transition temperature (Tg) might contribute to a stiff coating and can damage the fabric "hand feeling" of the printing media. In some examples, the polymeric binders have a glass transition temperature (Tg) ranging from −40° C. to 0° C. In some other examples, the polymeric binders have a glass transition temperature (Tg) ranging from −20° C. to −5° C. The way of measuring the glass transition temperature (Tg) parameter is described in, for example, Polymer Handbook, 3rd Edition, authored by J. Brandrup, edited by E. H. Immergut, Wiley-Interscience, 1989.

In some examples, the polymeric binders are crossed-linked binder. "Crossed-linked binder" refers to the fact that multiple polymer substances with reactive function groups can react with each other to form a between-molecular chain structure, a cross linker, a macro-molecular substance or a low molecular weight chemical with more than two function groups that can be used. Binders with "self-crosslink" capability can mean that macro-molecular chains have different reactive function groups that can be used. The cross-linked binders can balance both softness and mechanical strength of the coating layers.

Suitable polymeric binders include, but are not limited to, water soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. In a further example, the polymeric binder can include an acrylonitrile-butadiene latex.

In some other examples, the binder component is a latex containing particles of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof.

In one example, the polymeric binder may have an average molecular weight (Mw) of about 5,000 to about 200,000. In another example, the average molecular weight of the polymeric binder can vary from 10,000 Mw to about 200,000 Mw. In yet another example, the average molecular weight of the polymeric binder can vary from 20,000 Mw to 100,000 Mw. In a further example, the average molecular weight of the polymeric binder can vary from 100,000 Mw to 200,000 Mw. In one example, the polymeric binder can have a weight average molecular weight from 5,000 Mw to 200,000 Mw and can include polystyrene-butadiene emulsion, acrylonitrile butadiene latex, starch, gelatin, casein, soy protein polymer, carboxy-methyl cellulose, hydroxy-ethyl cellulose, acrylic emulsion, vinyl acetate emulsion, vinylidene chloride emulsion, polyester emulsion, polyvinyl pyrrolidine, polyvinyl alcohol, styrene butadiene emulsions, or combination thereof.

In some examples, the polymeric binder is a self-crosslinking aqueous acrylic dispersion such an Edolan® AB available from Tanatex Chemicals (having a solids content of 45% and Tg of −18° C.).

The primary coating composition (130) contains a polymeric binder and filler particles. The filler particles can include inorganic powder, inorganic mineral powder, organic powder and mixture of the both. In some examples, the fillers are particles that can include calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, silica, amorphous silica, synthetic amorphous silica, colloidal silica, alumina, colloidal alumina, boehmite, pseudo-boehmite, aluminum hydroxide, aluminum, lithopone, zeolite, magnesium carbonate, magnesium hydroxide, magnesium, calcium, clay, calcium carbonate, polystyrene, polymethacrylates, polyacrylates, polyolefins, polyethylene, polypropylene, copolymers, and combinations thereof. In some other examples, the filler particles can include calcium carbonate. The calcium carbonate can be in the form of ground calcium carbonate, precipitated calcium carbonate, modified forms thereof, and combinations thereof. In another example, the filler particles can include calcium carbonate and clay.

In some examples, the primary coating composition (130) contains filler particles that have a nature of flame retardancy (or flame retardancy properties) or contains fillers and, separately, a flame retardant agent. The fillers that have a nature of flame retardancy or flame retardancy properties can be considered as flame retardant agents. As flame retardant agent, it is meant herein any substance that inhibits or reduces flammability or delays their combustion of the media containing it.

In some examples, the "fillers" can be solid particles in the room temperature having flame retardancy properties. In some other examples, the "fillers" also refers to the solid powder package that include a solid powder in the room temperature which has lower or limited flame retardancy properties in one example, or has no capability of flame retardancy properties in another example. In this case, the "filler package" or also called "filler", comprises a solid particle compounds and a flame retardant agent either in solid or liquid state in room temperature. The examples of fillers are, for example, but not limited to, an organohalogenated compound, a polymeric brominated compound, a metal oxide and phosphorus containing composition, a phosphorus and halogen containing composition, a phosphorus continuing composition, a nitrogen containing composition, a halogen, an organophosphate, or a combination thereof.

In one example, the fillers with flame retardancy properties can include a mineral compound. Exemplary mineral compounds can include aluminum hydroxide, magnesium hydroxide, huntite (magnesium calcium carbonate), hydromagnesite (hydrated magnesium carbonate), phosphorus, red phosphorus, boehmite (aluminum oxide hydroxide), boron compounds, or combinations thereof. In another example, the flame retardant in filler package can include either a liquid or a solid flame retardant such as organohalogenated compound. Exemplary organohalogenated compounds can include organobromines, organochlorines, decabromodiphenyl ether, decabromodiphenyl ethane, and combinations thereof.

In yet another example, either the filler or the flame retardant can include a polymeric brominated compound. Exemplary polymeric brominated compounds can include brominated polystyrenes, brominated carbonate oligomers, brominated epoxy oligomers, tetra-bromo-phthalic anhydride, tetra-bromo-bisphenol A, hexabromocyclododecane, chlorendic acid, ethers of chlorendic acid, chlorinated paraffins, and combinations thereof. In yet another example, either the filler or flame retardant can include a metal and phosphorus containing composition. Example metal and phosphorus containing compositions can include aluminum diethylphosphinate, calcium diethylphosphinate, and combinations thereof. In a further example, either the filler or the flame retardant can include a phosphorus and a halogen containing composition. Exemplary phosphorus and halogen containing compositions can include tris(2,3-dibromopropyl) phosphate, chlorinated organophosphates, tris(1, 3-dichloro-2-propyl) phosphate, tetrakis(2-chloroethyl) dicloro-isopentyldiphosphate, tris (1,3-dichloroisopropyl) phosphate, tris(2-chloroisopropyl) phosphate, and combinations thereof.

In some example, either the filler or the flame retardant can include a phosphorus containing composition. Exemplary phosphorus containing compositions can include phosphates, phosphonates, phosphinates, and combinations thereof. In some examples, the phosphorus containing composition can have different oxidations states. In one example, the phosphorus containing composition can be a closed ring structure such as FR-102® (available from Shanghai Xusen Non-Halogen Smoke Suppressing Fire Retardants Co. Ltd, China) and Aflammit® (available from Thor, Germany). In another example, the phosphorus containing composition can be a water soluble phosphorus containing compound. Exemplary water soluble phosphorus containing compositions can include, a phosphonate ester with one or two, closed 4 to 6 member phosphorus containing ring structures. In one example, the water soluble phosphorus containing composition can be 5-ethyl-2-methyl-1,3,2,-dioxaphosphorinan-5-yl)methyl dimethyl phosphonate P oxide. In another example, the water soluble phosphorus containing composition can be bis[(-ethyl-2-methyl-1,3,2-dioxaphosphorinan-5-yl)methyl] methyl phosphonate P,P'-dioxide. In another example, either the filler or the flame retardant can include a nitrogen containing composition. Exemplary nitrogen containing compositions can include melamines, melamine derivatives, melamine, melamine cyanurate, melamine polyphosphate, melem (heptazine derivative), melon (heptazine derivative), and combinations.

In some examples, either the filler or the flame retardant can be a combination of a phosphorus containing compound, a nitrogen containing compound, and/or a halogen. In one example, the flame retardant can include a phosphorus and a nitrogen containing composition. Exemplary phosphorus and nitrogen containing compositions can include ammonium polyphosphate (APP), poly 4,4-diaminodiphenyl methane spirocyclic pentaerythritol bisphosphonate (PD-SPB), 1,4-di(diethoxy thiophosphamide benzene (DTPAB), and combinations. In another example, either the filler or the flame retardant can include an organophosphate. The organophosphate can include aliphatic phosphate; aliphatic phosphonate; aromatic phosphonate; aliphatic organophosphate; aromatic organophosphate; polymeric organophosphate with 2 or 3 oxygen atoms attached to the central phosphorus and combinations.

In some examples, the flame retardant agents or the filler particles with flame retardancy properties are selected from the group consisting of phosphorus-containing compounds, nitrogen-containing compounds, organophosphate compounds, alumina trihydrate and calcium carbonate. In some other examples, the filler particles with flame retardancy properties are selected from the group consisting of phosphorus-containing compounds, nitrogen-containing compounds, organophosphate compounds, alumina trihydrate and calcium carbonate. In yet some other examples, the flame retardant agents or the filler particles with flame retardancy properties are selected from the group consisting of phosphorus-containing compounds and nitrogen-containing compounds. The flame retardant, either in solid state or in liquid state, can also be selected from the group consisting of phosphorus-containing compounds, nitrogen-containing compounds, organophosphate compounds, alumina trihydrate and calcium carbonate.

Examples of commercially available products, with flame retardancy properties and the flame retardant either in solid state or in liquid state include FR102® (available from Shanghai Xusen Co Ltd) or Aflammit® PE and Aflammit® MSG (both available from Thor), Exolit® AP compounds (available from Clariant), solid Aflammit® powder compounds (available from Thor), Disflamoll® DPK (available from Lanxess), Phoslite B compounds (available from Italmatch Chemicals), or SpaceRite® S-3 (J.M. Huber Corp).

In some examples, the filler or filler package or filler particles with flame retardancy properties or flame retardant agent is present, in the primary coating layer composition (130), in an amount representing from about 10 to about 90 wt % by total weigh of the primary coating layer composition. In some other examples, the filler or filler package or flame retardant agent is present, in the primary coating layer composition (130), in an amount representing from about 5 wt % to about 90 wt %, or from about 10 wt % to about 80 wt %, or from about 15 wt % to about 70 wt %, by total weigh of the primary coating layer composition.

The filler or the filler package can include a mineral powder, an organo-halogenated compound, a polymeric brominated compound, a metal and phosphorus containing composition, a phosphorus containing composition, a nitrogen containing composition, a halogen, an organophosphate, or combination thereof.

In some examples, in "filler package", the ratio of filler particles to flame retardant agent can vary from about 2 to about 35 by dry weight. In some other examples, the ratio of filler particles to flame retardant agent can range from 3 to about 20 by dry weight. In yet some other examples, the ratio of filler particles to flame retardant agent can range from about 5 to about 15. The size of the filler particles can also vary. In one example, the filler particles can have an average particle size ranging from about 0.1 µm to about 20 µm. In another example, the filler particles can have an average particle size ranging from about 0.2 µm to about 18 µm. In yet another example, the filler particles can have an average particle size ranging from about 0.5 µm to about 10 µm. In a further example, the filler particles can have an average particle size ranging from about 1 µm to about 5 µm. The filler particles can include from 5 wt % to about 95 wt % of the primary coating layer based on dry weight of the primary coating layer and can have an average particle size from 0.1 µm to 20 µm. The filler particles can be added to the primary coating layer in the form of a dry powder, dispersed in a slurry, or in the form of an aqueous suspension.

The Image-Receiving Layer (140)

The fabric print medium (100) of the present disclosure includes an image-receiving layer (140). The image-receiving layer (140), or inkjet receiving layer, will form a coating layer and is applied over the primary coating composition (130) on the fabric base substrate (110). In some examples, the image-receiving layer is applied to both side of the fabric base substrate (110) over the primary coating (130). The image-receiving layer would act as the image-receiving layer since, during the printing process, the ink will be directly deposited on its surface.

In some examples, the image-receiving coating composition is applied to the primary coating composition at a coat weight ranging from about 0.1 to about 40 gsm (gram per square meter) or at a coat weight ranging or from about 1 to 20 gsm (gram per square meter). In some other examples, the image-receiving coating composition is applied to the primary coating composition at a thickness ranging from about 1 µm to about 50 µm with a dry coat weight ranging from about 0.5 gsm to about 50 gsm.

In some examples, the image-receiving layer includes a first and a second crosslinked polymeric network. The wording "polymer network" refers herein to a polymer and/or a polymer mixture which can be self-cross-linked, by reaction of different function groups in the same molecular chain, or inter-cross-linked by reaction with another compound which has different function group. In some other examples, the image-receiving layer includes a first and a second polymeric network. In yet some other examples, the image-receiving layer includes a first and a second polymeric network that are crosslinked polymeric network. The first crosslinked polymeric network and the second crosslinked polymeric network can be either different or identical by their chemical natures.

The image-receiving layer (140) comprises a first crosslinked polymeric network and a second crosslinked polymeric network. In some examples, the image-receiving layer comprises a first crosslinked polymeric network, a second crosslinked polymeric network, and filler particles. The filler particles can be inorganic filler particles, organic particles, particles with or without flame retardancy nature, and flame retardants. The filler particles can be the same or different as the one used in the primary coating composition as described previously.

In some examples, the first crosslinked polymeric network can be crosslinked to itself. In another example, the first crosslinked polymeric network can be crosslinked to itself and to the second crosslinked polymeric network. In one example, the second crosslinked polymeric network can be crosslinked to itself. When the first crosslinked polymeric network and the second crosslinked polymeric network are not crosslinked to one another they can be entangled or appear layered onto one another.

The first and second crosslinked polymeric networks can be present in the secondary coating layer in a variety of amounts. The first and second crosslinked polymeric networks can collectively represent from about 80 wt % to about 99 wt % of the total weight of the image-receiving layer. In another example, the first and second crosslinked polymeric networks can collectively represent from about 85 wt % to about 95 wt % of the total weight of the image-receiving layer. In a further example, the first and second crosslinked polymeric networks can collectively range from about 85 wt % to about 93 wt % of the total weight of the image-receiving layer. In some examples, the first and second crosslinked polymeric networks can be present in equal amounts. In other examples, the first and second crosslinked polymeric networks can be present in different amounts.

In some examples, in the image-receiving coating composition, the first crosslinked polymeric network and the second crosslinked polymeric network are different and independently comprises polyacrylate, polyurethane, vinylurethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. The first and/or the second crosslinked polymeric networks can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. In some examples, the first and second crosslinked polymeric networks can be different polymers.

In one example, the first and/or the second crosslinked polymeric network can include a polyacrylate based polymer. Exemplary polyacrylate based polymers can include polymers made by hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, $C_1$-$C_{12}$ alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), and combinations thereof. Polymers made from the polymerization and/or copolymerization of alkyl acrylate, alkyl methacrylate, vinyl esters, and styrene derivatives may also be useful. In one example, the polyacrylate based polymer can include polymers having a glass transition temperature greater than 20° C. In another example, the polyacrylate based polymer can include polymers having a glass transition temperature of greater than 40° C. In yet another example, the polyacrylate based polymer can include polymers having a glass transition temperature of greater than 50° C.

In some examples, the first and/or the second crosslinked polymeric network can be formed by using self-cross linked polyurethane polymers or cross-linkable polyglycidyl or polyoxirane resins. In some other examples, the first and/or second crosslinked polymeric network can be formed by using self-cross linked polyurethane polymers. The self-cross linked polyurethane polymer can be formed by reacting an isocyanate with a polyol. Exemplary isocyanates used to form the polyurethane polymer can include toluenediisocyanate, 1,6-hexamethylenediisocyanate, diphenylmethane-diisocyanate, 1,3-bis(isocyanatemethyl)cyclohexane, 1,4-cyclohexyldiisocyanate, p-phenylenediisocyanate, 2,2,4(2, 4,4)-trimethylhexamethylenediisocyanate, 4,4'-dicyclohexlymethanediisocayanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetra-isocyanate, triphenyl-methane-tri-isocyanate, tris(iso-cyanate-phenyl)thiophosphate, and combinations thereof. Commercially available isocyanates can include Rhodocoat® WT 2102 (available from Rhodia AG, Germany), Basonat® LR 8878 (available from BASF Corporation, N. America), Desmodur® DA, and Bayhydur® 3100 (Desmodur® and Bayhydur® are available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclo-hexane-dimethanol; 1,2,3-propanetriol; 2-ethyl-2-hydroxymethyl-1, 3-propanediol; and combinations thereof. In some examples, the isocyanate and the polyol can have less than three functional end groups per molecule. In another example, the isocyanate and the polyol can have less than five functional end groups per molecule. In yet another example, the polyurethane can be formed from a polyisocyanate having at least two isocyanate functionalities and a polyol having at least two hydroxyl or amine groups. Exemplary polyisocyanates can include diisocyanate monomers and oligomers. The self-cross linked polyurethane polymer can also formed by reacting an isocyanate with a polyol, where both isocyanates and polyols have average less than three end functional groups per molecule so that the polymeric network is based on a liner polymeric chain structure.

The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through acetoacetoxy functionality. In some other examples, the first and/or second cross-linked polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac®R-9000, R-9699 and R-9030 (from Zeneca Resins), Sancure®AU4010 (from Lubrizol) and Hybridur®570 (from Air Products).

In one example, the weight average molecular weight of the polyurethane polymer used in the first and/or second crosslinked polymer can range from about 20,000 Mw to about 200,000 Mw as measured by gel permeation chromatography. In another example, the weight average molecular weight of the polyurethane polymer can range from about 40,000 Mw to about 180,000 Mw as measured by gel permeation chromatography. In yet another example, the weight average molecular weight of the polyurethane polymer can range from about 60,000 Mw to about 140,000 Mw as measured by gel permeation chromatography.

Exemplary polyurethane polymers can include polyester based polyurethanes, U910, U938 U2101 and U420; polyether based polyurethane, U205, U410, U500 and U400N; polycarbonate based polyurethanes, U930, U933, U915 and U911; castor oil based polyurethane, CUR21, CUR69, CUR99 and CUR991; and combinations thereof (All of these polyurethanes are available from Alberdingk Boley Inc., North Carolina, USA).

The polymeric network (the first and/or second) can include a polymeric core that is, at least, one polyurethane. The polyurethanes include aliphatic as well as aromatic polyurethanes. The polyurethane is typically the reaction products of the following components: a polyisocyanate having at least two isocyanate (—NCO) functionalities per molecule with, at least, one isocyanate reactive group such as a polyol having at least two hydroxy groups or an amine. Suitable polyisocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure®2710 and/or Avalure®UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure®878, Sancure®815, Sancure®1301, Sancure®2715, Sancure®2026, Sancure®1818, Sancure®853, Sancure®830, Sancure®825, Sancure®776, Sancure®850, Sancure®12140, Sancure®12619, Sancure®835, Sancure®843, Sancure®898, Sancure®899, Sancure®1511, Sancure®1514, Sancure®1517®, Sancure®1591, Sancure®2255, Sancure®2260, Sancure®2310, Sancure®2725, and Sancure®2016 (all commercially available from Lubrizol Inc.).

Other examples of commercially-available polyurethanes can include NeoPac®R-9000, R-9699, and R-9030 (available from Zeneca Resins, Ohio), Printrite® DP376 and Sancure® AU4010 (available from Lubrizol Advanced Materials, Inc., Ohio), and Hybridur® 570 (available from Air Products and Chemicals Inc., Pennsylvania).

In some example, the polymeric network is created by using cross-linkable polyglycidyl or polyoxirane resins. Cross-link reaction can take place either with themselves (through catalytic homopolymerisation of oxirane function group) or with the help of a wide range of co-reactants including polyfunctional amines, acids, acid anhydrides, phenols, alcohols, and thiols. Both polyglycidyl resin and co-reactants are compatible with the chemicals that form a polymeric network before curing in liquid state. The term "compatible" refers here to the fact that there is no significant phase separation after mixing in the room temperature.

In some examples, the first and/or the second polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez® AR555 (commercially available from Air Products), Ancarez®AR550, Epi-rez®3510W60, Epi-rez® 3515W6, or Epi-rez® 3522W60 (commercially available from Hexion).

In some other examples, the polymeric network includes epoxy resin. Examples of suitable aqueous dispersions of epoxy resin include Waterpoxy® 1422 (commercially available from Cognis) or Ancarez® AR555 1422 (commercially available from Air Products). The polymeric network can comprise epoxy resin hardeners. The examples of epoxy resin hardeners that can be used herein include liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available hardeners include Anquawhite 100 (from Air Products) and EPI-CURE® 8290-Y-60 (from Hexion). The polymeric network can include water-based polyamine as epoxy resin hardeners. Such epoxy resin hardeners can be, for examples, water-based polyfunctional amines, acids, acid anhydrides, phenols, alcohols and/or thiols. Other examples of commercially available polymeric networks that can be used herein includes the ingredients Araldite® PZ 3921 and/or Aradur® 3985 available from Huntsman.

In some examples, the image-receiving layer includes a first and/or second polymeric network that is a hybrid network created by using self-cross linked polyurethane polymers and by using cross-linkable polyglycidyl or polyoxirane resins. In some other examples, the image-receiving layer comprises a polymeric network that is created by using vinyl-urethane hybrid copolymers or acrylic-urethane hybrid polymers and water-based epoxy resins and water-based polyamines. In a further example, the first and/or second crosslinked polymeric network can include a styrene maleic anhydride (SMA). In one example, the SMA can include NovaCote 2000® (Georgia-Pacific Chemicals LLC, Georgia). In another example, the styrene maleic anhydride can be combined with an amine terminated polyethylene oxide (PEO); amine terminated polypropylene oxide (PPO), copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. In one example, utilizing an amine terminated PEO and/or PPO in combination with a SMA can allow for the user to retain the glossy features of the SMA while eliminating the brittle nature of SMA. Exemplary commercially available amine terminated PEO and/or PPO compounds can include Jeffamine® XTJ-500, Jeffamine® XTJ-502, and Jeffamine® XTJ D-2000 (all available from Huntsman International LLC, Texas). In some examples, a weight ratio of SMA to the amine terminated PEO and/or PPO can range from about 100:1 to about 2.5:1. In another, a weight ratio of the SMA to the amine terminated PEO and/or PPO can range from about 90:1 to about 10:1. In yet another example, a weight ratio of the SMA to the amine terminated PEO and/or PPO can range from about 75:1 to about 25:1.

In some examples, the image-receiving layer might further comprises filler particles. Such filler includes inorganic compounds, organic compounds, compounds with flame retardancy nature, and flame retardant agents. The filler particles can be the same or different as the one used in the primary coating composition as described previously.

In some examples, the filler compounds have an average particle size in the range of about 0.05 to about 25 micrometers ($\mu$m, $10^{-6}$ m). In some other examples, the inorganic compounds have an average particle size in the range of about 0.1 to about 10 micrometers ($\mu$m). The amount of filler compound, in the image-receiving layer, can be within the range of about 5 to about 70 wt % or within the range of about 10 to about 60 wt % or within the range of about 15 to about 50 wt % by total weight of the image-receiving layer. Examples of the fillers include but not limited to, calcium carbonate, zeolite, silica, talc, alumina, aluminum trihydrate (ATH), calcium silicate, kaolin, calcined clay, and combination or mixtures of any of these. Examples of commercial available compound, also includes, but are not limited to, ground calcium carbonate such as Hydrocarb® 60 available from Omya, Inc.; precipitated calcium carbonate such as Opacarb®A40 or Opacarb®3000 available from Specialty Minerals Inc. (SMI); clay such as Miragloss® available from Engelhard Corporation; synthetic clay such as hydrous sodium lithium magnesium silicate, such as, for example, Laponite® available from Southern Clay Products Inc., and titanium dioxide ($TiO_2$) available from, for example, Sigma-Aldrich Co. Examples of fillers include, but are not limited to, compound, either existing in a dispersed slurry or in a solid powder, of polystyrene and its copolymers, polymethacrylates and their copolymers, polyacrylates and their copolymers, polyolefins and their copolymers, such as polyethylene and polypropylene, a combination of two or more of the polymers. The filler compound may be chosen from silica gel (e.g., Silojet®703C available from Grace Co.), modified (e.g., surface modified, chemically modified, etc.) calcium carbonate (e.g., Omyajet®B6606, C3301, and 5010, all of which are available from Omya, Inc.), precipitated calcium carbonate (e.g., Jetcoat®30 available from Specialty Minerals, Inc.), and combinations thereof.

In addition to the above-described components, the image-receiving layer might contain other components or additives. The additives include, but are not limited to, one or more of rheology modifiers, thickening agents, cross-linking agents, surfactants, defoamers, optical brighteners, dyes, pH controlling agents or wetting agents, and dispersing agents, for example. The total amount of additives, in the composition for forming the treatment composition, can be from about 0.1 wt % to about 10 wt % or from about 0.2 wt % to about 5 wt %, by total dry weight of the treatment composition.

Method for Forming a Fabric Print Medium

The fabric print medium is prepared by using a surface treatment composition herein named a coating layer or coating composition. A method for forming the fabric print medium, according to the present disclosure, encompasses: providing a fabric base substrate with a first and a second side; extruding a polymeric barrier layer or laminating a polymeric barrier with adhesion property on, at least, one side of the fabric base substrate; applying a primary coating composition including a polymeric binder and filler particles over the barrier layer; and applying an image-receiving coating composition including a first crosslinked polymeric network and a second crosslinked polymeric network, over the primary coating composition.

In one examples, the method includes the extrusion of a polymeric barrier layer (130) on, at least, one side of the fabric base substrate. In another example, the method includes the lamination of a polymeric barrier layer (130) on, at least, one side of the fabric base substrate. The method includes then applying a primary coating composition, over the polymeric barrier layer, in order to form a primary coating layer and applying a secondary coating composition, over the primary coating layer, to form a secondary coating layer.

In some examples, the lamination of the polymeric barrier layer (130) is done with an adhesive compound if the polymeric barrier layer does not have adhesion property. In some other examples, the lamination of the polymeric barrier layer (130) is done without an adhesive compound if the polymeric barrier layer has adhesion property. In yet some other examples, the polymeric barrier layer is laminated with adhesive compounds that comprise ethylene residues, ethyl acrylate residues or acrylic ester residues and maleic anhydride residues.

In some examples, as illustrated in FIG. 3, the method (201) includes providing a fabric base substrate with a first and a second side (210); extruding a polymeric barrier layer on at least one side of the fabric base substrate (221); applying a primary coating composition, including a polymeric binder and filler particles over the barrier layer (230); and applying an image-receiving coating composition including a first and a second crosslinked polymeric network, over the primary coating composition (240). In some other examples, as illustrated in FIG. 4, the method (202) includes providing a fabric base substrate with a first and a second side (210); laminating a polymeric barrier layer that has adhesion property on at least one side of the fabric base substrate (222); applying a primary coating composition, including a polymeric binder and filler particles, over the barrier layer (230); and applying an image-receiving coating composition including a first and a second crosslinked polymeric network, over the primary coating composition (240).

The polymer barrier layer (130) can be applied to the fabric base substrate by an extrusion process: the barrier layer is extruded on at least one side of the base substrate with the use of a heat melted extrusion coating processing. The polymeric barrier layer is extrusion coated on at least one side of the fabric base substrate with a coat weight ranging from about 3 to about 50 grams per square meter (gsm), or with a coat weight ranging from about 5 to about 200 gsm. The barrier layer can also be made by hot melt extrusion technique. As used herein, the terms extrude and hot melt extrusion refer to process wherein the material is heated to a temperature at, or above, its melting point and deposited on a moving substrate at a uniform thickness. In some examples, in the extrusion process, the material is heated to a considerably higher temperature than its melting point. The extrusion process may be practiced within a wide range of extrusion temperatures, for example, from about 310° C. to about 350° C. in case of polyethylene, and speeds, for example, from about 5 m/min to about 30 m/min. In such extrusion processes, the component of the barrier layer is first subjected to heat and pressure inside the barrel of an extruder. The molten polymer is then forced through the narrow slot of an extrusion-coating die by an extruder screw. At the exit of the slot die, a molten curtain emerges. In some examples, this molten curtain is drawn down from the die into a nip between two counter-rotating rolls, a chill roll and pressure roll. In some other examples, while coming into contact with a faster moving substrate in the nip formed between the chill roll and the pressure roller, a hot film is drawn out to the desired thickness, forming a layer with a specific thickness onto the substrate.

In some other examples, the polymer barrier layer (130) is applied to the fabric base substrate by a lamination process with or without an adhesive compound. The polymeric barrier layer, the adhesive compound and the fabric base substrate can be laminated together using a laminator. In some examples, the polymeric barrier layer, the adhesive compound and the fabric base substrate are fed together at a lamination roll where they are laminated together, and dried in a drying oven or dryer. The polymeric barrier layer, the adhesive compound and the fabric base substrate can be laminated together at a speed of 20 meters/min and dried using a peak temperature of 130° C. Examples of lamination equipment include, but are not limited to, Talon 64 (152.4 cm wide web) from GBC, Lincolnshire, Ill.; 62 Pro laminating machine (152.4 cm wide web) from Seal, Elkridge, Md.; and lamination machines from Polytype Converting Ltd., Freiburg, Switzerland. Coating and laminating machines may be obtained from Faustel, Germantown, Wis. and Black Clawson Ltd, Newport, South Wales, UK, for example.

In some examples, the primary coating layer that includes a polymeric binder and filler particles forms a layer that has a viscosity ranging from about 1,000 cps to about 30,000 cps, e.g., the viscosity of the composition is measured at room temperature at a speed of 100 rpm by a Brookfield viscometer. The primary coating layers can be applied to the first side and the second side of the fabric substrate, over the barrier layer, at an independent thickness ranging from 2 µm to 250 µm with an independent dry coat weight ranging from about 5 gsm to about 300 gsm. The primary coating layers can independently include a polymeric binder and filler particles. The secondary coating layers can be applied to the primary coating layer on both the first side and the second side at an independent thickness from 1 µm to 50 µm with an independent dry coat weight ranging from 0.5 gsm to 50 gsm. The fabric substrate with polymer barrier layer can also be pre-treated before the application of the primary coating layers with a corona treatment. The corona treatment refers to the application of low temperature corona discharge plasma, which is generated under high voltage with electrode that has a sharp tip, on the surface of polymer barrier layer. The secondary coating layers can independently include a first crosslinked polymeric network and a second crosslinked polymeric network. The primary coating layers can be two or more times thicker than their respective immediately adjacent secondary coating layer. The term "independently" is used in this example to indicate that though both sides have the same general parameters, the respective layers on each side does not need to be identical.

In some examples, the method can further include applying pressure using pressure nips on the coater or off-line calendar to the fabric media after applying the primary coating layer and/or top image-receiving layer. The calendaring can be carried out under a temperature ranging from about 40° C. to about 100° C., and a pressure of about 1,000-5,000 PSI. The application of the primary coating composition (primer layer composition) and of the image-receiving coating composition (secondary coating layer) can include a floating knife process, a knife on roll mechanism process, or a transfer coating process. The floating knife process can include stretching the fabric to form an even uniform surface. The floating knife process can further include transporting the fabric under a stationary knife blade. In some examples, the step of applying the primary and secondary coating layer can include applying a foam coating. The foam coating can be applied using a knife-on-the roll mechanism. The knife-on-the roll mechanism can be followed by passing the fabric through calendaring pressure nips. The calendaring can be done either in room temperature or at an elevated temperature and/or pressure. The elevated temperature can range from 40° C. to 100° C. The elevated pressure can range from about 1,000 psi to about 5,000 psi. In some other examples, the coating process can include transferring the coating composition. When the coating composition is transferred, the coating can be spread onto a release substrate to form a film. The film can then be laminated onto the fabric.

The coating compositions can be dried using box hot air dryer. The dryer can be a single unit or could be in a serial of 3 to 7 units so that a temperature profile can be created with initial higher temperature (to remove excessive water) and mild temperature in end units (to ensure completely drying with a final moisture level of less than 1-5% for example). The peak dryer temperature can be programmed into a profile with higher temperature at begging of the drying when wet moisture is high and reduced to lower temperature when web becoming dry. The dryer temperature is controlled to a temperature of less than about 200° C. to avoid yelling textile, and the fabric web temperature is controlled in the range of about 90 to about 180° C. In some examples, the operation speed of the padding/drying line is 10-40 meter per minute.

Printing Method

Once the coating compositions are applied to the fabric base substrate and appropriately dried, ink compositions can be applied by any processes onto the obtained fabric print medium. In some examples, the ink composition is applied to the fabric print medium via inkjet printing techniques. As illustrated in FIG. 5, the printing method (300) encompasses thus: obtaining a fabric print medium having a fabric base substrate with a first and a second side; a polymeric barrier layer that is extruded, or a polymeric barrier layer with adhesion property that is laminated, on at least one side of the fabric base substrate; a primary coating composition including a polymeric binder and filler particles applied over the polymeric barrier layer; and an image-receiving coating composition including a first and a second crosslinked polymeric network that is applied over the primary coating composition (310); and, then, applying an ink composition onto said fabric print medium to form a printed image (320). Said printed image will have, for instance, enhanced image quality and image permanence. In some examples, when needed, the printed image can be dried using any drying device attached to a printer such as, for instance, an IR heater.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the fabric print medium, is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and chemical components used in the illustrating samples are listed in Table 1.

TABLE 1

| Ingredients | Nature of the ingredients | Supplier |
|---|---|---|
| Araldite ® PZ 3901 | Cross-linked polymeric network | Hundtsman Inc |
| Aradur ® 3985 | Cross-linked polymeric network | Hundtsman Inc |
| SpaceRite ® S-3 | Aluminum trihydroxide - Flame retardant agent | J. M. Huber Corp. |
| Byk-Dynwet ® 800 | silicone-free wetting agent | BYK USA, Inc. |
| BYK ®-024 | VOC-free silicone defoamer | BYK USA, Inc. |
| Tegowet ® 510 | Surfactant | Evonik Industries |
| Sancure ®2026 | Polyurethane polymer | Lubrizol Inc. |
| Sancure ®AU4010 | Self-Crosslinking aliphatic polyurethane-acrylic network | Lubrizol |

TABLE 1-continued

| Ingredients | Nature of the ingredients | Supplier |
|---|---|---|
| Edolan ® AB | Polymeric binder | Tanatex Chemicals |
| Lotader ® 3410 | adhesive compound | Arkema |

Example 1

Preparation of Printable Medium Samples

The fabric samples 1, 2, 3 and 4 are print medium in accordance with the principles described herein. Samples 5 and 6 are comparative examples. Detailed structures of the fabric samples are shown in Table 2.

TABLE 2

| Printable medium_samples | Support base structure (110) and Barrier layer (120) | Primary coating layer (130) | Image-receiving coating layer (140) |
|---|---|---|---|
| Sample 1 | Base A | PC | IRC |
| Sample 2 | Base B | PC | IRC |
| Sample 3 | Base C | PC | IRC |
| Sample 4 | Base D | PC | IRC |
| Sample 5 Comparative | Base E | PC | IRC |
| Sample 6 Comparative | Base F | PC | IRC |

The fabric base substrate (110) is a 100% woven polyester fabric that has a basis weight of about 105 gsm. Different barrier layers (120) are applied to the fabric base substrate as illustrated in Table 3. The barrier layer are applied either via an extrusion process or with a lamination process. When applied via lamination, the barrier layer includes an adhesive compound if the barrier layer itself does not have good adhesion properties.

The extrusion of the polymeric barrier layer (120) is accomplished by a lab extruder (manufactured by Randcastile Extrusion System), which consists of a resin feeding hopper, the heated barrel, a rotating screw, a screen changer, a die adapter and a 12" die. The temperature are set up as 90° C., 150° C., 175° C., 175° C.; the adaptor and die are set up at 175° C. and 180° C. respectively. The lamination of the polymeric barrier layer (120) is accomplished by a lab lamination test bed where two roll holders can held both fabric substrate and lamination film. A third holder can also be available if an adhesive film to be used. The combination nips apply heat at a temperature of 160° C. and a pressure about 1000 PSI. PVC is a polymeric binder having good adhesion properties that provide thus good adhesion properties to the barrier layer. The fabric substrates with barrier layer are subjected to a corona treatment by passing through high voltage electrodes.

TABLE 3

| | Support base structure (110) and Barrier layer (120) | | | | | |
|---|---|---|---|---|---|---|
| | Base A | Base B | Base C | Base D | Base E (comparative) | Base F (comparative) |
| Fabric | 105 gsm weaving polyester | 105 gsm weaving polyester | 105 gsm weaving polyester | 105 gsm weaving polyester | 105 gsm weaving polyester | 105 gsm weaving polyester |
| Barrier layer (120) | LLDPE | LLDPE | PVC | PVC | LLDPE | None |
| Method to form the barrier layer | Extrusion | Lamination | Lamination | Lamination | Lamination | N/A |

TABLE 3-continued

| | Support base structure (110) and Barrier layer (120) | | | | | |
|---|---|---|---|---|---|---|
| | Base A | Base B | Base C | Base D | Base E (comparative) | Base F (comparative) |
| Adhesive film for lamination | N/A | Lotader ®3410 | Lotader ®3410 | N/A | N/A | N/A |

The primary coating compositions are applied as primary coating layers (130) to the support base structure (110) and barrier layer (120) A, B, C, D, E or F with a coat weight of 8 gsm. Each of the primary coating compositions are mixed by a Lab mixer and coated onto the respective fabric substrates using a Mathis Lab Coater Model LTE-S (Werner Mathis, AG Switzerland). The primary coating layers (130) are dried at 120° C. for 5 min in a hot air oven attached to the coater. The samples are further subjected to a calendering process in order to smooth out the surface at about 54.4° F. and 2,000 PSI.

The image-receiving coating compositions (140) are applied directly on top of the primary coating layer (130) in order to form a secondary layer and in order to produce the samples 1, 2, 3, 4, 5 or 6. The image-receiving coating compositions (140) are applied using a lab ECS blade coater made by Euclid Coating System Inc, USA with a coat weight of 10 gsm. The image-receiving coating layers are then dried in Fisher Scientific™ Isotemp™ Standard Lab Ovens at 120° C. for 10 min. The formulations of the primary coating (130), i.e. PC, and the formulations of the image-receiving coating composition (140), i.e. IRC, are illustrated in Table 4 below.

TABLE 4

| Ingredient | Amount (Parts by dry weight) |
|---|---|
| Primary Coating (130) - PC | |
| Edolan ® AB | 40 |
| Spacerite ® S1 | 100 |
| Tegowet ® 510 | 1 |
| Foamaster VG | 0.5 |
| Image-receiving coating (140) - IRC | |
| Byk-Dynwet ® 800 | 1 |
| BYK ®-024 | 0.5 |
| Araldite ® PZ 3901 | 100 |
| Aradur ® 3985 | 100 |
| Sancure ® 2016 | 58 |
| Sancure ® 4010 | 35 |

Example 2

Samples Performances

The same images are printed on the Samples 1, 2, 3 and 4 and Comparison Samples 5 and 6 using an HP® DesignJet L360 Printer equipped with HP 789 ink cartridge (HP Inc.). The printer is set with a heating zone temperature at about 50° C., a cure zone temperature at about 110° C., and an air flow at about 15%. The printed fabric mediums are evaluated for different performances: image quality, image durability, back clearness, softness, and wrinkling performances. The results of these tests are expressed in Table 5 below.

Image quality is evaluated using both numeric measurement method and visual evaluation method. Image quality tests are conducted by measuring the color gamut, using XYZ color patches on Macbeth® TD904 device (Micro Precision Test Equipment, California). The image quality of the prints related to bleed sharpness, blur, noise/graininess, banding, mottle, patchiness, line quality, and text quality, are evaluated visually from the printed samples using a scale of 1-5 (with 1 being the worst and 5 being the best).

The image durability test is performed by exposing the various samples to be tested to a 45 degree coin scratching under a normal force of 800 g. The test is done in a BYK Abrasion Tester (from BYK-Gardner USA, Columbus, Md.) with a linear, back-and-forth action, attempting to scratch off the image side of the samples (5 cycles). The image durability is evaluated visually from the printed samples using a scale of 1-5 (with 1 being the worst and 5 being the best).

The "back clearness", which accesses the degree of ink penetration, is evaluated from the backside of the printed media with 150% black ink loading. Each testing item is given a rating score according to a 1 to 5 scale, wherein 1 means the worst performance (presence in the backside of the printed media of lots of ink dots) and 5 represents the best performance (i.e. the backside is free of ink dot).

The softness and wrinkling performances are evaluated "manually", by multiple operators (n=5) by initial hand feeling and then crumping in hands for 1 min to see extent of wrinkling. An average score of 1 was given when resenting stiff and serious wrinkling, and a score of 5 was given if the when resenting soft and insignificant wrinkling.

TABLE 5

| Test Results Sample | Image quality | Image durability | softness and wrinkling performances | Back cleanness (degree of ink penetration) |
|---|---|---|---|---|
| Example 1 | 5 | 5 | 5 | 5 |
| Example 2 | 5 | 5 | 5 | 5 |
| Example 3 | 5 | 5 | 5 | 5 |
| Example 4 | 5 | 5 | 4 | 5 |
| Example 5 (comp.) | 5 | 5 | 2 | 4 |
| Example 6 (comp.) | 5 | 4 | NA | 1 |

As can be seen by the test results above, the fabric print medium according to the present disclosure provides several advantages over the comparative samples in terms of image quality, image durability, back cleanness and softness and wrinkling performances. It is noted that though some comparative medium performed well in some categories, they performed poorly in others. In accordance with examples of the present disclosure, over all of these tests, performance is collectively better when using the fabric print medium described herein.

The invention claimed is:

1. A fabric print medium comprising:
   a. a fabric base substrate with a first and a second side;
   b. a polymeric barrier layer that is extruded, or a polymeric barrier layer with adhesion property that is laminated, on at least one side of the fabric base substrate;
   c. a primary coating composition including a polymeric binder and filler particles applied over the polymeric barrier layer; and
   d. an image-receiving coating composition including a first and a second crosslinked polymeric network applied over the primary coating composition, wherein the first and second crosslinked polymeric networks collectively represent from 80 wt % to 99 wt % of the total dry weight of the image-receiving coating composition.

2. The fabric print medium of claim 1 wherein the polymeric barrier layer contains a polyolefin polymer material, an agro-based polymer material or combinations thereof.

3. The fabric print medium of claim 1 wherein the polymeric barrier layer contains resins that are selected from the group consisting of high density polyethylene (HDPE), low density polyethylene (LDPE), polypropylene (PP), polymethylpentene (PMP), and copolymers of ethylene with hexane, butane, and octane (linear low density polyethylene, LLDPE).

4. The fabric print medium of claim 1 wherein the polymeric barrier layer contains blends of polymers that are selected from the group consisting of polyethylene (PE) and polypropylene (PP), blended with group consisting of polymethylpentene, polybutylene polymer, ethylene vinyl acetate polymer and mixtures thereof.

5. The fabric print medium of claim 1 wherein the polymeric barrier layer is laminated with adhesive compounds that comprise ethylene residues, ethyl acrylate residues or acrylic ester residues and maleic anhydride residues.

6. The fabric print medium of claim 1 wherein the polymeric barrier layer contains polymers or polymer blends that have a glass transition temperature (Tg) that is below 10° C.

7. The fabric print medium of claim 1 wherein the polymeric barrier layer is applied at a dry coat weight ranging from about 0.5 gsm to about 50 gsm per side in top of the fabric base substrate.

8. The fabric print medium of claim 1 wherein the primary coating composition further comprises flame retardant agents or filler particles with flame retardancy properties.

9. The fabric print medium of claim 8 wherein, in the primary coating composition, the flame retardant agents or the filler particles with flame retardancy properties are selected from the group consisting of phosphorus-containing compounds, nitrogen-containing compounds, organophosphate compounds, alumina trihydrate and calcium carbonate.

10. The fabric print medium of claim 1 wherein, in the primary coating composition, the polymeric binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers.

11. The fabric print medium of claim 1 wherein, in the image-receiving coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

12. The fabric print medium of claim 1 wherein, in the image-receiving coating composition, the first and/or the second crosslinked polymeric network are formed by using self-cross linked polyurethane polymers or cross-linkable polyglycidyl or polyoxirane resins.

13. An image recording medium comprising:
   a. a fabric base substrate with a first and a second side;
   b. a polymeric barrier layer that is extruded, or a polymeric barrier layer with adhesion property that is laminated, on at least one side of the fabric base substrate wherein the polymeric barrier layer contains resins that are selected from the group consisting of high density polyethylene (HDPE), low density polyethylene (LDPE), polypropylene (PP), polymethylpentene (PMP), and copolymers of ethylene with hexane, butane, and octane (linear low density polyethylene, LLDPE);
   c. a primary coating composition applied over the polymeric barrier layer; and
   d. an image-receiving coating composition over the primary coating composition, wherein the image-receiving coating composition comprises a first and a second crosslinked polymeric network that collectively represent from 80 wt % to 99 wt % of the total dry weight of the image-receiving coating composition.

14. A method for forming a fabric print medium comprising:
   a. providing a fabric base substrate with a first and a second side;
   b. extruding a polymeric barrier layer, or laminating a polymeric barrier layer with adhesion property on, at least, one side of the fabric base substrate;
   c. applying a primary coating composition, including a polymeric binder and filler particles over the polymeric barrier layer;
   d. and applying an image-receiving coating composition including a first and a second crosslinked polymeric network, over the primary coating composition, wherein the first and second crosslinked polymeric networks collectively represent from 80 wt %) to 99 wt % of the total dry weight of the image-receiving coating composition.

15. A printing method comprising:
   a. obtaining a fabric print medium having a fabric base substrate with a first and a second side; a polymeric barrier layer that is extruded, or a polymeric barrier layer with adhesion property that is laminated, on at least one side of the fabric base substrate; a primary coating composition including a polymeric binder and filler particles applied over the polymeric barrier layer; and an image-receiving coating composition including a first and a second crosslinked polymeric network that is applied over the primary coating composition, wherein the first and second crosslinked polymeric networks collectively represent from 80 wt % to 99 wt % of the total dry weight of the image-receiving coating composition;

b. and applying an ink composition onto said fabric print medium to form a printed image.

16. The fabric print medium of claim 1 wherein the image-receiving coating composition is devoid of filler.

* * * * *